United States Patent
Tarlow et al.

(10) Patent No.: US 9,213,081 B2
(45) Date of Patent: Dec. 15, 2015

(54) COOPERATIVE POSITIONING

(75) Inventors: Ben Tarlow, Cottenham (GB); Murray Jarvis, Stapleford (GB)

(73) Assignee: QUALCOMM Technologies International, LTD., Cambridge (GB)

( * ) Notice: Subject to any disclaimer, the term of this patent is extended or adjusted under 35 U.S.C. 154(b) by 217 days.

(21) Appl. No.: 13/449,881

(22) Filed: Apr. 18, 2012

(65) Prior Publication Data
US 2012/0289243 A1    Nov. 15, 2012

(30) Foreign Application Priority Data
May 11, 2011    (GB) .................................. 1107849.0

(51) Int. Cl.
| | |
|---|---|
| H04W 24/00 | (2009.01) |
| G01S 5/02 | (2010.01) |
| G01S 5/00 | (2006.01) |
| G01S 19/25 | (2010.01) |
| G01S 19/48 | (2010.01) |
| H04W 4/02 | (2009.01) |
| H04W 4/20 | (2009.01) |

(52) U.S. Cl.
CPC .............. *G01S 5/0257* (2013.01); *G01S 5/0072* (2013.01); *G01S 5/0236* (2013.01); *G01S 19/258* (2013.01); *G01S 19/48* (2013.01); *H04W 4/02* (2013.01); *H04W 4/20* (2013.01)

(58) Field of Classification Search
CPC ...... H04W 64/00; H04W 4/023; G01S 19/51; G01S 11/06; G01S 19/25; G01S 19/48; G01S 5/0063; G01S 5/02; G01S 5/0236; G01S 5/30; G01S 5/0009; G01S 5/0257; G01S 5/0278; G01S 5/0289; G01S 5/06
USPC ............. 455/456.1–456.6, 404.2; 340/539.13
See application file for complete search history.

(56) References Cited

U.S. PATENT DOCUMENTS

| | | | | |
|---|---|---|---|---|
| 7,856,209 | B1 * | 12/2010 | Rawat ......................... | 455/67.11 |
| 8,126,477 | B2 * | 2/2012 | Dravida et al. ............ | 455/456.3 |
| 8,417,264 | B1 * | 4/2013 | Whitney ............... | H04W 64/00 |
| | | | | 455/456.6 |
| 2003/0149527 | A1 | 8/2003 | Sikila | |

(Continued)

FOREIGN PATENT DOCUMENTS

| | | |
|---|---|---|
| CN | 1688892 A | 10/2005 |
| WO | WO 2004/008171 | 1/2004 |

OTHER PUBLICATIONS

European Search Report for EP Application No. EP 12164693, dated Aug. 22, 2012.

(Continued)

*Primary Examiner* — Olumide T Ajibade Akonai
*Assistant Examiner* — Edward Zhang
(74) *Attorney, Agent, or Firm* — The Marbury Law Group, PLLC

(57) ABSTRACT

A system for determining a position of a pair of portable devices in close proximity to one another, the system comprising: a first portable device configured to form first positioning data for use in accordance with a first position determination mechanism; and a second portable device operable to calculate a position in accordance with the first position determination mechanism; wherein the first portable device is configured to transmit said first positioning data to the second portable device, and the second portable device is configured to calculate a position of the first and second portable devices in dependence on the first positioning data.

22 Claims, 3 Drawing Sheets

(56) References Cited

U.S. PATENT DOCUMENTS

| | | | |
|---|---|---|---|
| 2004/0008138 A1 | 1/2004 | Hockley et al. | |
| 2004/0258012 A1* | 12/2004 | Ishii | H04L 47/10 455/404.2 |
| 2006/0030333 A1* | 2/2006 | Ward et al. | 455/456.1 |
| 2008/0051102 A1* | 2/2008 | Matsubara | 455/456.1 |
| 2008/0284645 A1* | 11/2008 | Terada et al. | 342/357.08 |
| 2009/0160711 A1* | 6/2009 | Mehta | 342/450 |
| 2009/0197617 A1* | 8/2009 | Jayanthi | 455/456.2 |
| 2009/0201850 A1 | 8/2009 | Davis et al. | |
| 2010/0317368 A1* | 12/2010 | Augst et al. | 455/456.1 |
| 2011/0176523 A1* | 7/2011 | Huang et al. | 370/338 |

OTHER PUBLICATIONS

Chinese Office Action with translation issued in related Chinese Application No. 201210444891.9, dared Jul. 21, 2015.

* cited by examiner

COOPERATIVE POSITIONING

BACKGROUND OF THE INVENTION

This invention relates to a system and method by which a set of portable devices can cooperatively determine their position or improve an estimate of their position.

It is becoming increasingly common for portable devices to be provided with one or more techniques by which they may determine their geographical location. For some devices, such as hand-held GPS receivers, their primary function is to accurately determine their position and provide this information to the user. For other devices, such as mobile telephones, it can be useful for the device to be able to at least roughly determine their location. This allows the mobile telephone to make use of location-based services. For example, knowledge of a user's location can allow a smartphone to provide a map of the user's location, allow digital photographs captured with the device to be geotagged, allow webpages to be served that include content relevant to the user's location, and generally allow applications running on the smartphone to make use of the location information.

There are many techniques by which portable devices can determine their location. The use of Global Navigation Satellite Systems (GNSS), such as the Global Positioning System (GPS) or GLONASS system, allow geographical position to be determined to a high degree of accuracy but it is not typically possible for a portable device to receive a signal whilst inside a building or in dense urban areas. Certain improvements to the GPS system, such as Assisted GPS (A-GPS), are used that increase the likelihood of a device determining its position in difficult environments. A-GPS allows a mobile network enabled device to download almanac and/or ephemeris information for the GPS satellites from a central server and can provide an accurate time to the device. However, A-GPS does not improve the likelihood that a GPS-enabled device can determine its location if that device cannot receive signals from at least four different satellites. This is a common occurrence in dense urban environments.

Less accurate positioning methods include cellular and wifi location determination methods that can provide a rough location for a portable device through the knowledge that if the device is connected to a particular cell base station or wifi access point then it must be within a particular distance of the known location of that cell base station or Wi-Fi access point. Devices able to detect multiple types of cell base stations, or those of different providers, can improve the resolution of their location estimate through trilateration of their position relative to those base stations and/or access points that are in range. It is advantageous if devices can utilise as many different wireless technologies as possible so as to increase the number of base stations or access points that might be detectable at any point in time. Wireless technologies that can be useful in aiding a mobile device in determining its position include GSM, 3G, LTE, WiMAX, Wi-Fi.

Various refinements of these wireless network-based methods are available that further improve the accuracy of a device's location estimate. In order to determine the distance of the device from the base station or access point, these refinements generally rely on a combination of the received signal strength, the time taken by signals to propagate between the base station and device, and (for cellular systems that utilise a directional antenna) the direction from which the signals are received. Examples of positioning methods that incorporate these refinements include E-Cell ID and E-OTD.

Despite their lower accuracy, cellular and Wi-Fi location determination methods are often more reliable indoors and in dense urban environments than satellite-based location methods. Portable devices that are to perform well in both outdoor environments that offer good reception of navigation satellite signals and in indoor or dense urban environments must generally support a multitude of communication technologies. For example, smartphones typically include a GPS receiver, one or more mobile network transceivers (e.g. GSM, 3G), and often a Wi-Fi transceiver (e.g. IEEE 802.11n).

However, not all devices include multiple radio transceivers and many are not equipped to determine their location in indoor or urban environments—for example, GPS receivers designed for use in the wilderness. Other devices often do not include any means by which they can determine their location, yet would benefit from knowing their location—for example, digital cameras could be configured to geotag photos with the location at which they were taken were the camera to receive such information.

There is therefore a need for improved methods by which portable devices can determine their location, particularly in indoor and dense urban environments.

SUMMARY OF THE INVENTION

According to a first aspect of the present invention there is provided a system for determining a position of a pair of portable devices in close proximity to one another, the system comprising: a first portable device configured to form first positioning data for use in accordance with a first position determination mechanism; and a second portable device operable to calculate a position in accordance with the first position determination mechanism; wherein the first portable device is configured to transmit said first positioning data to the second portable device, and the second portable device is configured to calculate a position of the first and second portable devices in dependence on the first positioning data.

Suitably the second portable device is configured to form second positioning data for use in accordance with the first position determination mechanism and calculate said position of the first and second portable devices additionally in dependence on the second positioning data.

Suitably the second portable device is operable to calculate its position in accordance with a second position determination mechanism and is configured to form second positioning data for use in accordance with the second position determination mechanism and calculate said position of the first and second portable devices additionally in dependence on the second positioning data. The second portable device could be configured to combine the first and second positioning data so as to provide a more accurate estimate of the position of the first and second portable devices than is possible in dependence on the first or second positioning data alone.

Suitably the first positioning data does not comprise an indication of a position of the first portable device.

Preferably the first portable device is operable to calculate its position in accordance with the first position determination mechanism.

The first positioning data could be insufficient to allow a unique position to be calculated according to the first position determination mechanism.

Preferably the second portable device is configured to calculate the position of the first and second portable devices on the assumption that the first and second portable devices are collocated.

Suitably the second portable device is configured to transmit the second positioning data to the first portable device, and the first portable device is configured to calculate the position of the first and second portable devices in dependence on the second positioning data. Preferably the first portable device is configured to calculate the position of the first and second portable devices on the assumption that the first and second portable devices are collocated. Preferably the first and second portable devices are configured to exchange their respective determinations of the position of the first and second portable devices.

Preferably the first and second portable devices are operable to communicate by means of a short range radio protocol having a range of less than approximately 100 meters, less than approximately 50 meters, or less than approximately 10 meters. Preferably the short range radio protocol is Bluetooth Low Energy and the first portable device is configured to transmit the first positioning data to the second portable device over a broadcast channel.

The system could further comprise a relay device configured to relay communications between the first and second portable devices.

Suitably the first position determination mechanism is a GNSS position determination mechanism, and the first positioning data is one or more of: almanac information; ephemeris information, code phase measurements; and pseudorange information.

Suitably the second position determination mechanism is a GNSS position determination mechanism, and the second positioning data is one or more of: almanac information; ephemeris information; code phase measurements; and pseudorange information.

Suitably the first position determination mechanism is a cellular position calculation mechanism, and the first positioning data is one or more of: a list of one or more identifiers of cells detectable by the first portable device; signal strengths of signals received at the first portable device from one or more cell transmitters; propagation times of signals received at the first portable device from one or more cell transmitters; differences in arrival times of simultaneously-transmitted signals received at the first portable device from one or more cell transmitters; angle of arrival information for signals received at the first portable device from one or more cell transmitters; and information identifying the location of one or more cells. The cellular position calculation mechanism could be one of Cell of Origin, E-OTD, or E-CID.

Suitably the first position determination mechanism is a Wi-Fi position calculation mechanism, and the first positioning data is one or more of: a list of one or more BSSIDs of Wi-Fi access points detectable by the first portable device; signal strengths of signals received at the first portable device from one or more Wi-Fi access points; propagation times of signals received at the first portable device from one or more Wi-Fi access points; and information identifying the location of one or more Wi-Fi access points. Suitably the first portable device is configured to perform the steps of: receiving the locations of a set of one or more Wi-Fi access points; and estimating its distance from at least some of the set of one or more Wi-Fi access points in dependence on the strength of signals received from the at least some Wi-Fi access points.

The second position determination mechanism could be a position determination mechanism based on received cellular, GNSS, Wi-Fi, or Bluetooth signals.

Each of the first and second portable devices could be one of a mobile phone, a tablet computer, a personal location device, a laptop, and a digital camera.

According to a second aspect of the present invention there is provided a method for determining the position of a pair of portable devices in close proximity to one another, the method comprising: a first portable device of a pair: forming positioning data for use in accordance with a position determination mechanism; and transmitting the positioning data to a second portable device of the pair; and the second portable device: in accordance with the position determination mechanism, calculating a position of the pair of portable devices in dependence on the positioning data.

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Whilst it has been noted that a given portable device will often include only a limited number of methods by which it may determine its geographical location, or may not include any such methods at all, it is often the case that there will be many portable devices in close proximity that are operable to wirelessly communicate with one another. This is particularly likely to be true in an indoor environment and in dense urban environments. It may also be true as a result of an individual carrying multiple electronic devices—for example, a smartphone, PDA, and digital camera. Each device might utilise different methods for determining their location. The devices might be operable to communicate with one another by, for example, the Bluetooth Low Energy communications protocol.

The present invention recognises that it would be advantageous for portable devices in close proximity to one another to be able to share information useful for location estimation so as to allow devices to improve the accuracy of their location estimate, or to allow devices to determine their position where it would not otherwise be possible. The methods described herein relate to the exchange or transmission of positioning information in dependence on which a device can calculate a position but which does not itself represent a fully-resolved position of a device.

Figure 1:
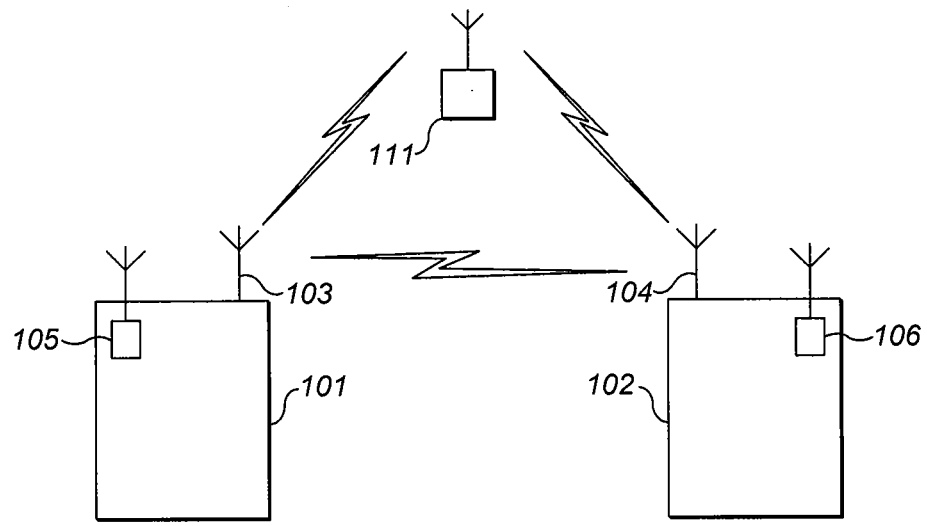
FIG. 1 is a schematic diagram of a pair of portable devices configured in accordance with the present invention.

A pair of portable devices 100 configured in accordance with the present invention is shown in FIG. 1. The portable devices 101, 102 are configured to communicate by means of transceivers 103 and 104. Preferably the devices communicate directly with one another, but alternatively the devices could communicate by means of an intermediary device 111. Importantly, devices 101 and 102 are in close proximity: this is arranged by configuring the devices to communicate by means of a radio protocol whose range is limited such that two devices in communication with one another must be in close proximity (i.e. a short range radio protocol), or by arranging that the devices communicate by means of a radio protocol that is not limited to short range and configuring each device to monitor received signal strength and/or the propagation time of signals between the devices in order to ensure that the devices are in close proximity to one another. For example, a device could be configured to exchange positioning data with another device only if signals from that other device are received with a signal strength above a predetermined level and/or the propagation time of signals between the devices is determined to be less than a predetermined time.

A suitable short range radio protocol could be Bluetooth or Bluetooth Low Energy. Bluetooth has a typical maximum range outdoors of around 100 meters for Class 1 devices and around 10 meters for Class 2 devices; Bluetooth Low Energy has a typical maximum range outdoors of around 50 meters. Within buildings the distance over which two Bluetooth devices can communicate is often significantly less than these approximate maximum ranges due to attenuation of the radio signals by walls and other objects.

Each device includes a receiver 105, 106 by means of which it can receive radio signals of a predetermined type for determining its position. Devices 101 and 102 are operable to calculate their position according to predetermined mechanisms using the received radio signals. For example, receiver 105 might be a GPS receiver by means of which device 101 can determine its location in accordance with calculations well-known in the art, and receiver 106 might be a 3G cellular receiver by means of which device 102 can determine its location in accordance with the E-OTD standard (Enhanced Observed Time Difference). The two devices could utilise the same mechanisms for determining their respective positions. Each device could be operable to determine its position in accordance with a plurality of different mechanisms and could include multiple receivers.

By way of example only, a device 101 or 102 could be configured to determine its position in accordance with one or more of any of the following:

- a Global Navigation Satellite System (GNSS) such as GPS, GLONASS, Galileo or Compass, with a device calculating its position using signals received from a plurality of navigation satellites;
- a cellular location determination standard such as Cell of Origin (COO), E-OTD, or E-CID (Enhanced Cell ID), with the position of a device being determined using the known locations of the base stations of the cells that are in range of the device and possibly refined using estimates of the distance of the device from the base stations calculated from measurements of propagation delay and/or received signal strength and/or time difference of arrival of signals and/or directional information received from directional antenna systems of the base stations;
- a location determination system based on the reception of IEEE 802.11 ("Wi-Fi") Service Set Identifiers (BSSIDs) that identify wireless access points, with the position of a device being determined using the known location of the access points that are in range of the device and possibly refined using estimates of the distance of the device from the access point calculated from measurements of propagation delay and/or received signal strength.

In certain environments it may be difficult or impossible for a device to determine its position using the location determination mechanisms available to it. For example:

- a device comprising a GPS receiver might find it difficult or impossible to determine its position according to the GPS receiver within a building or a dense urban environment due to occlusion and reflection of the satellite signals;
- a device comprising a mobile phone receiver (e.g. GSM/3G) would not be able to determine its position according to the receiver if it cannot receive a mobile phone signal (e.g. in a wilderness area or within a building);
- a device comprising an Wi-Fi receiver would not be able to determine its position according to the receiver if it cannot receive a Wi-Fi signal (e.g. the device is out of range of a wireless access point).

It is therefore useful if a device supports more than one mechanism by which it can determine its location but this is not always practicable. The present invention provides an alternative solution to this problem. Typically, even if a device cannot fully resolve its position according to the techniques available to it, the device will have generated or collected positioning data that might identify a rough position for the device, or that might allow the position of the device to be determined were additional positioning data available.

The present invention recognises that positioning data available to a portable device might be useful to other portable devices that are within the vicinity (typically a few meters to a few tens of meters); or, conversely, that a device is more likely to be able to determine its position if it receives positioning data from other devices in the vicinity. More generally, by pooling the positioning data available to all the devices that are in close proximity to one another it is more likely that: (a) the common position of the devices can be determined where prior to the pooling of the positioning data none of the devices could determine their position, or (b) one or more of the devices can improve its determination of its position as a result of receiving positioning data from another device.

Positioning data can be any information that can be used by a device in the determination of its position. Examples of positioning data that might be generated or collected by a device include:

- pseudorange, receive epoch, almanac, ephemeris, satellite Doppler frequency, carrier to noise ratio or integrity information, relating to a GNSS system such as GPS;
- fine or coarse GPS time of week (TOW) information;
- Wi-Fi access point information, such as a list of BSSIDs representing access points that are within range of the device;
- address information and/or building information, such as floor or room number;
- cellular receive epochs, observed time differences (OTDs), network name and local cell identifier information;
- Bluetooth transmitter information, such as the device names of devices having a known location;
- context information that can aid a device in determining its location, such as information noting lack of GPS coverage (this can help a device to preserve its battery life since it allows a device to turn off its GPS receiver when it is informed that no useful signal can be received), information noting that the device is within a building, or information noting that multipath interference has been detected on a GNSS satellite signal.
- information regarding device capabilities that allows co-operative strategy decisions to be made—for example, a device with very limited battery capacity may choose not to measure GPS pseudo-ranges it has obtained already from, say, a co-located smart-phone even if the device has GPS capability.

Configuring portable devices to share position information when in close proximity to one another is advantageous for several reasons. Firstly, different devices might use different location determination mechanisms and therefore one device might be able to determine its position whilst another device cannot—sharing this positioning data allows both devices to make use of the position calculated in dependence on the positioning data. Secondly, even when two devices are using the same location determination mechanism and are in relatively close proximity to one another, differences between the technical specifications of the devices and/or slight differences in the local environment of the devices might cause two devices to generate different positioning data—sharing this positioning data might allow both devices to improve their position estimates or to determine their position where it is not possible using either set of positioning data alone. Thirdly, in situations in which two or more devices can determine their position, sharing positioning data allows devices to detect and/or correct for erroneous position estimates. These advantages are explored further in the examples discussed below.

Figure 2:
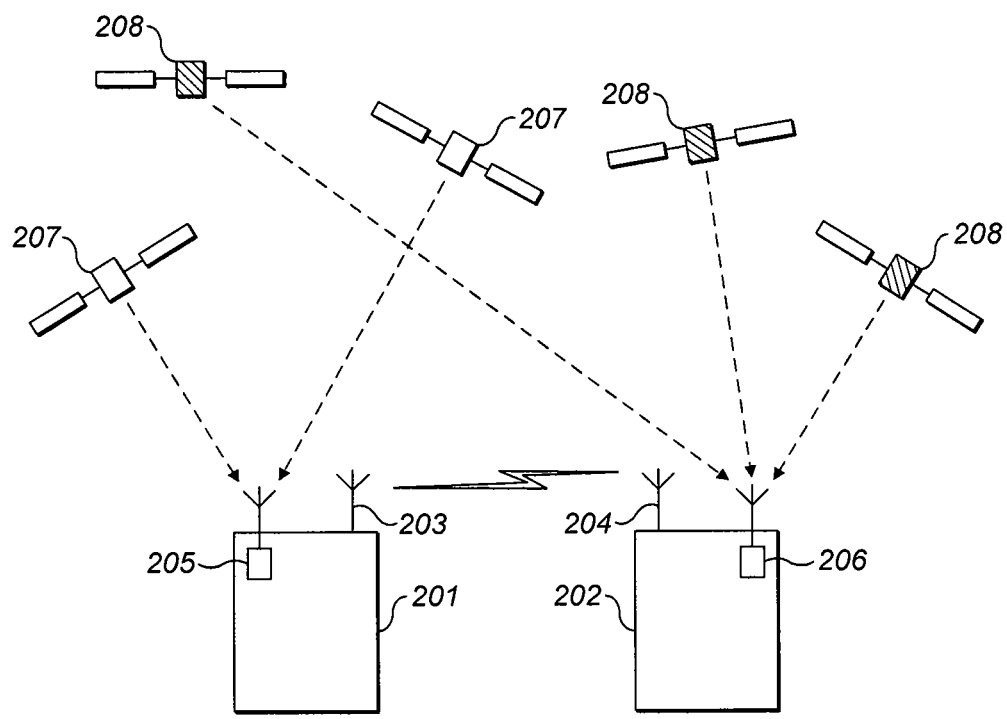
FIG. 2 is a schematic diagram of a pair of portable devices according to a first exemplary use of the present invention.

FIG. 2 illustrates a first exemplary use of the present invention. Device 201 comprises a GPS receiver 205 and makes code phase measurements at time $t_1$ of two GPS satellites 207. Device 202 comprises a GLONASS receiver 206 and makes code phase measurements at time $t_2$ of three GLONASS satellites 208. In order to make the code phase measurements, each device determines the ephemeris information describing the orbits of the satellites in its respective GNSS or receives the ephemeris information from a server (e.g. in the case of A-GPS) or another device. However, neither device can receive signals from a sufficient number of satellites to determine its location. This may be due to occlusion of some of the satellites by, for example, buildings, mountains or trees.

Devices 201 and 202 are operable to exchange positioning data over their respective transceivers 203 and 204 by means of the Bluetooth Low Energy protocol. In this example, the positioning data comprises the code phase measurements established by each device, or alternatively pseudorange information derived from the code phase measurements expressing the distance from each receiver to its respective GNSS satellites. This provides each device with positioning data relating to five GNSS satellites in total, which is sufficient for the devices to determine their position. Under the assumption that the two devices are collocated, each device can determine its position by resolving the pseudoranges for the five satellites, or through processing of the code phase measurements with respect to the appropriate ephemeris information (or information describing the position and velocity of the satellites at the relevant epoch). In determining its position, each device estimates and can correct for its clock bias.

Note that in order for a position of the devices to be determined, the clock offset between the devices and, if two or more different GNSS systems are being used, the clock offset between those systems must be known. The clock offset between the devices can be determined through synchronisation of the device clocks to a common source (such as a mobile base station or time server accessible over a network to the devices) and/or by means of any mechanism known in the art for determining the offset of two communicating devices. The clock offset between different GNSS systems could be calculated by the devices from data accessible to the devices over a network or from data stored at the devices. (GNSS system clocks are highly accurate and can therefore be readily calculated for an arbitrary point in time).

Thus, by sharing positioning data, devices 201 and 202 can determine their common position in situations where neither device can resolve its position on its own. This can be particularly useful in cities in which GNSS signal reception can be difficult and devices separated by only a few meters can have very different views of the sky. More generally, there may be a plurality of devices all configured to share positioning data in the described manner. In other embodiments, the devices may be configured such that only one of the devices transmits its positioning data to the other. Preferably in such embodiments, a device that receives positioning data and successfully determines its location subsequently transmits data representing that location to the other device.

In an alternative example related to FIG. 2, consider the case in which device 202 can make code phase measurements of five GLONASS satellites 208 and can therefore resolve its position. In accordance with the present invention, on determining its position, device 202 makes positioning data representing its determined position available to other devices in the vicinity, such as device 201. This informs device 201 of its position and, on the assumption that the devices are collocated, allows device 201 to determine and correct for its clock bias and clock frequency error. The present invention therefore relates to the exchange between approximately collocated portable devices of both incomplete positioning data that does not itself represent the location of the transmitting device and complete positioning data that does represent the location of the transmitting device.

There are many mechanisms known in the art that allow devices to communicate highly accurate timing and frequency information—any such mechanisms could be used with devices configured in accordance with the present invention. For example, fine frequency information can be communicated from a first to a second device by arranging the first device to transmit a tone at a predetermined frequency according to its clock; the second device can then lock onto the tone and infer its clock offset relative to the first device's clock. To give a second example, fine time information can be communicated from a first to a second device by arranging the first device to transmit a signal such as a frame boundary at a specified time; by determining when the signal is received at the second device according to its clock, the second device can infer its clock offset relative to the first device's clock. Typically mechanisms are further designed to take account of transmission and receive delays (which are generally fixed) at the devices.

Figure 3:
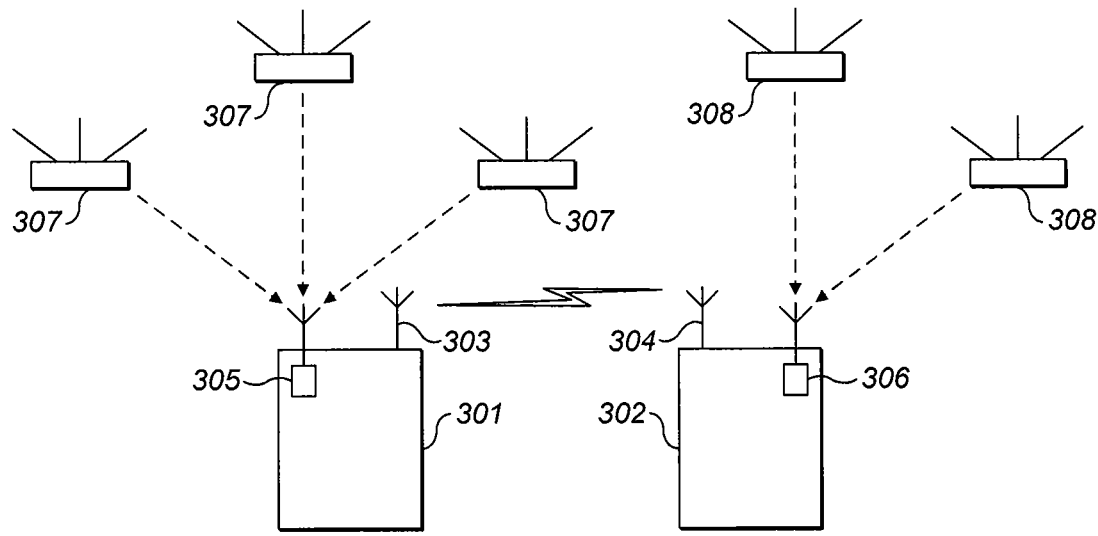
FIG. 3 is a schematic diagram of a pair of portable devices according to a second exemplary use of the present invention.

FIG. 3 illustrates a second exemplary use of the invention. Device 301 includes a Wi-Fi receiver 305 and makes measurements of a set of Wi-Fi access points 307 that are detectable by the device. Device 302 also includes a Wi-Fi receiver 306 and makes measurements of a set of Wi-Fi access points 308 that are detectable by the device. Typically, the Wi-Fi measurements made by the devices would include the BSSID and RSSI (received signal strength indication) of each access point. Such measurements allow a device to estimate its position if the device has access to data identifying the location of the access points having the detected BSSIDs. By knowing the location of the access points detectable to a device and a measure of the range within which each access point is detectable, the device can roughly calculate its position. This can be improved by using the RSSI to estimate the distance of the device from each of the access points based on attenuation of the signal strength. Such techniques are well known in the art, and are discussed, for example, in "Location Systems for Ubiquitous Computing", J. Hightower and G. Borriello, Computer, Vol. 34, No. 8, 2001; and in "Location Sensing Techniques", J. Hightower and G. Borriello, Technical Report, University of Washington, Department of Computer Science and Engineering, August 2001.

Devices 301 and 302 are operable to exchange positioning data over their respective transceivers 303 and 304 by means of the Bluetooth Low Energy protocol. In this example, device 301 transmits to device 302 the set of BSSID and RSSI values for the access points it can detect. Device 301 does not have access to a data set identifying the locations of access points in the local area and cannot therefore itself determine its position. Device 302 does have access to such a data set and, on receiving the positioning data comprising the BSSIDs and respective RSSI values for access points 307, can accurately estimate its position through trilateration using the BSSID and RSSI values for access points 307 and 308.

Device 302 could be configured to transmit to device 301 positioning data representing at least some of the data set that identifies the locations of access points local to the devices. This would allow device 301 to determine its own position by performing the necessary trilateration calculations. Device 302 could additionally transmit to device 301 positioning data representing the set of access points it can detect so as to allow device 301 to include the positioning data associated with access points 308 in its calculation of its position.

Arranging that devices 301 and 302 can share positioning data representing the Wi-Fi access points detectable by each device allows each device to improve its position estimate as a result of the increased diversity of access points and RSSI values. The present invention is of particular advantage within buildings, in which two devices separated by only a few meters might detect different sets of Wi-Fi access points. Signals from even relatively close Wi-Fi access points can be occluded by people, walls, lift shafts, metal filing cabinets and the like. By pooling positioning data representing local access points, devices can benefit from positioning data gathered at multiple locations and a device is more likely to be able to calculate its position with respect to a complete set of local Wi-Fi access points.

Signal strength is particularly strongly affected by the local environment of the access point and device. For example, the signal strength of an access point detected by a user's portable device can depend on where the device is located on the user with respect to that access point—a weaker signal might be detected if the device is in the user's hand or the user's body is located between the access point and the device. This can lead to position errors in an estimate by a device of its location and is especially marked for devices that can detect only one or two access points. By providing a mechanism by which a device can receive positioning data from adjacent devices, the present invention can increase the number measurements that the device has available for its position calculation. This can be achieved by increasing the number of access points used in the position calculation, increasing the number of measurements from an access point, and also mitigate the effect of occlusion on any measurements from common APs. These methods make position measurements made by a device less susceptible to outlying signal strength measurements.

Devices 301 and 302 could be configured so as to not include transceivers 303 and 304 and communicate by means of Wi-Fi transceivers 305 and 306. In order to ensure that the devices are in close proximity to one another (say, a few meters to a few tens of meters) each device is preferably configured to, for example: utilise positioning data received from devices whose signals exceed a predetermined signal strength (RSSI); utilise positioning data received only from devices connected to the same access point; or utilise positioning data received from devices from which the propagation delay is less than a predetermined time.

Figure 4:
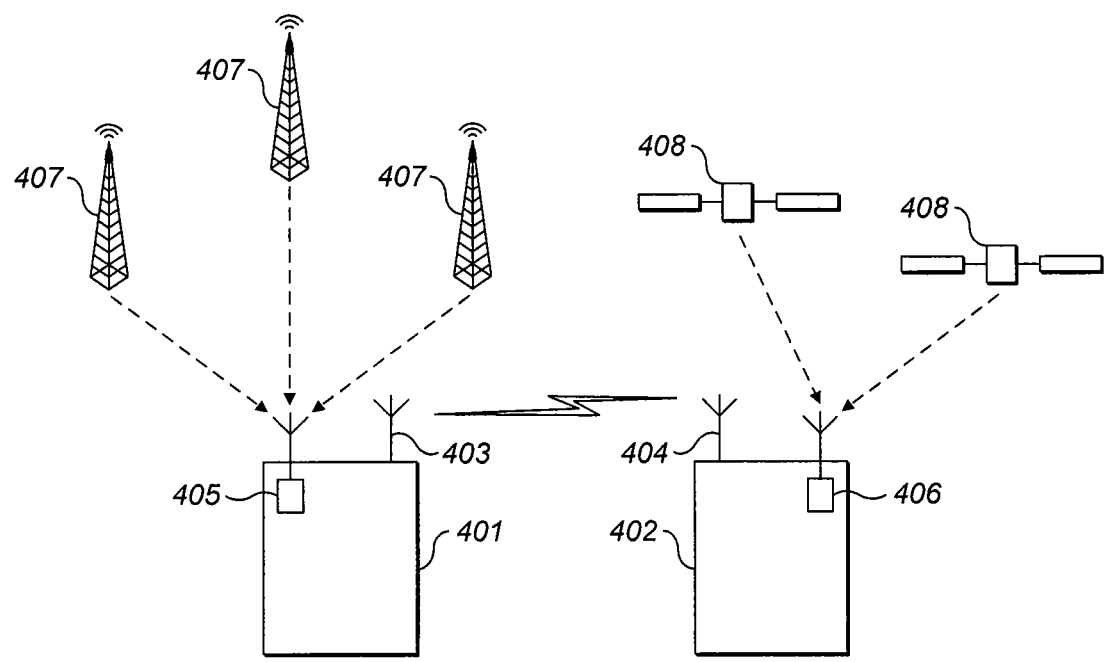
FIG. 4 is a schematic diagram of a pair of portable devices according to a third exemplary use of the present invention.

Devices configured in accordance with the present invention are preferably not limited to exchanging positioning data with devices having the same mechanisms for location determination. FIG. 4 illustrates a third exemplary use of the invention. Device 401 includes a cellular network receiver 405 (such as a GSM, 3G or 4G radio receiver) and makes time of arrival measurements of signals from local cellular base stations 407 in order to estimate its distance from those base stations and hence allow an initial estimate of its position to be determined. Device 402 includes a GPS receiver and makes code phase and receive epoch measurements of GPS signals from two satellites 408.

Devices 401 and 402 have established a Bluetooth link by means of their respective transceivers 403 and 404. In this example, device 402 transmits its code phase measurements and receive epochs to device 401. On receiving the positioning data, device 401 resolves the cellular time of arrival measurements with the GPS code phase measurements and receive epochs so as to give an estimate of the position of the devices. In other words, device 401 solves the GPS position calculations on behalf of device 402 using the cellular time of arrival measurements as constraints in those calculations and allows a single position to be determined. By transmitting data identifying the location of the devices to device 402, device 401 may allow the clock bias of device 402 relative to the GPS system to be solved.

In this example, device 401 has transmitted positioning data to device 401, which has performed the calculations. This could be because device 401 has greater processing power at its disposal (e.g. it could be a laptop computer). Alternatively, the devices could be configured to exchange positioning data, with device 401 transmitting its cellular time of arrival measurements to device 402, and both devices calculating their position in dependence on the two sets of positioning data.

Figure 5:
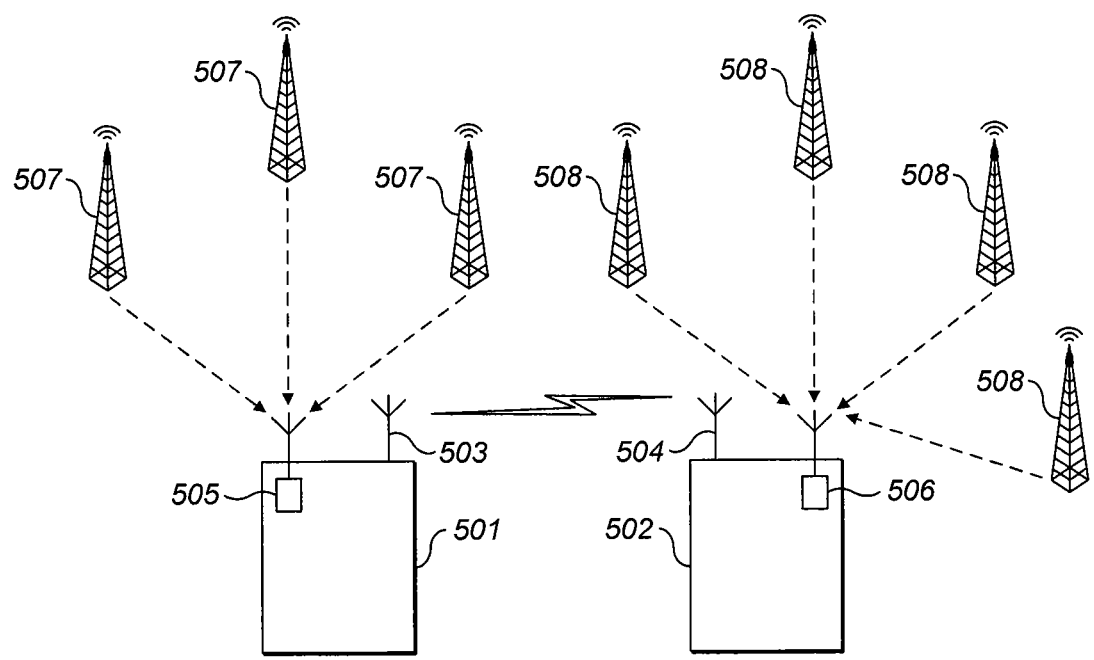
FIG. 5 is a schematic diagram of a pair of portable devices according to a fourth exemplary use of the present invention.

FIG. 5 illustrates a fourth exemplary use of the present invention. Device 501 includes a cellular network receiver 505 (such as a GSM, 3G or 4G radio receiver) configured to determine the local cell IDs of the in-range cellular base stations 507 and the RSSI values of their respective signals. The device is further configured to access by means of one or more of the cellular base stations data identifying the locations and, optionally, the transmission power of the cellular base stations. This information allows device 501 to estimate its distance from the base stations by means of trilateration. It is preferable that device 501 knows the transmission power of the base stations because this allows the RSSI values to be interpreted in the context of the power of the respective transmitter and improves the accuracy of the position estimate. Device 502 includes a cellular network receiver 506 that is configured to determine its position with respect to a different set of cellular base stations 508. In other words, devices 501 and 502 are configured to use different cellular network providers.

Device 501 is configured to transmit its local cell IDs and their associated RSSI values to device 502 over transceivers 503 and 504 by means of the Bluetooth Low Energy protocol. This allows device 502 to improve its position estimate because the device can further include the positioning data associated with the base stations of device 501 in its position estimate. Device 501 could receive positioning data from device 502 in exchange so as to more accurately estimate its position.

More generally, the cellular base stations 507 and 508 could be any kind of radio transmitter, such as Wi-Fi access points or Bluetooth transmitters of fixed location.

It is advantageous if portable devices configured in accordance with the present invention are arranged to make positioning data available to other portable devices with one another using the Bluetooth Low Energy protocol. Most advantageously, positioning data is made available to other devices over a Bluetooth Low Energy broadcast channel. This avoids the need for the Bluetooth devices to be paired prior to the transmission of positioning data.

It is advantageous if, in any of the examples of the invention described herein, devices are configured to exchange with one another any estimates of their location determined in dependence on received positioning data. Such information allows devices to verify their own position estimates and could be used by a device in estimating the error in its position estimates. For example, a GPS-enabled device in a dense urban environment might form an estimate of its position by means of its GPS receiver that, as a result of multi-path errors (e.g. reflections off local buildings), is erroneous. On receiving the position estimate of a nearby device that has estimated its position relative to a set of local Wi-Fi access points, the GPS-enabled device would be able to flag it's position as compromised and either fallback to an alternative method or at least ensure that the reported confidence is not misleading. Alternatively a composite fix involving both the Wi-Fi observations and also the GPS pseudo-ranges could be performed where the Wi-Fi observations act as additional constraints during the normal GPS solution process.

It is further advantageous if devices configured in accordance with the present invention are arranged to refine their position estimate by determining the separation of the devices (i.e. their relative position). Two devices configured in accordance with the present invention are arranged to communicate by means of radio transceivers as shown in the figures. Preferably the devices are arranged to communicate by a short range protocol such as Bluetooth, but alternatively the devices could be determined to be in close proximity to one another through measurements of received signal strength or the round trip time of messages transmitted between the devices.

In determining their common position, the devices assume themselves to be located at the same position. However, the resulting estimate of their common position can be refined for each device from an estimate of the distances between the devices. Such an estimate of the separation of devices could be determined through measurements of received signal strength. For example, signals from closer Bluetooth devices will be received with higher signal strengths than signals from Bluetooth devices that are further away; a rough estimate of the separation of two Bluetooth devices could therefore be estimated from the signal strength received at one device from the other device. In most cases the transmit power of the Bluetooth device could be assumed to be that of a Class II device (up to 2.5 mW) since most portable devices operate in this range. Alternatively, each device could be configured to inform adjacent devices of its transmitter power.

Preferably a positioning method shared by a pair of devices is used to determine the relative position of the devices—often this is possible where an accurate determination of their absolute position is not (e.g. because their absolute position estimates suffer from a common bias). For example, E-OTD allows the relative position of two mobile devices to be calculated from measurements made by means of base stations common to the two devices. Such relative positioning data can be used to further refine the position of each device. For instance, an absolute position determined for two devices in accordance with the present invention could be assumed to in fact represent the midpoint along a line representing the relative separation of the devices, with each device calculating its location to be the absolute position offset by its position relative to that midpoint.

It is to be understood that a position determined in accordance with the present invention could be either an absolute position of two or more portable devices (as in the examples described herein) or the relative position(s) of two or more portable devices. Thus a set of two or more devices configured in accordance with the present invention could exchange positioning data so as to allow the relative position of those devices to be determined, or allow an improved estimate of the relative position of those devices to be determined.

In preferred embodiments of the present invention, a portable device is configured to transmit a predetermined set of positioning data to any other appropriately configured portable devices in the vicinity. This could be achieved by broadcasting its positioning data to any devices that happen to be within range. Preferably a device periodically transmits any positioning data available to it. Most preferably, devices configured in accordance with the present invention are arranged to communicate by means of the Bluetooth Low Energy protocol, which provides dedicated broadcast channels over which positioning data can be exchanged by appropriately configured devices.

It can be advantageous to configure a device such that it can perform position calculations in dependence on data that it cannot itself receive. For example, a smartphone without a GPS receiver could be configured to perform GPS calculations on GPS code phase measurements received over Bluetooth from an adjacent GPS receiver device so as to estimate its position.

Portable devices are those devices that can be readily carried by a person and include hand-held devices (such as mobile telephones and tablet computers) and laptop devices (such as notebook computers).

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A system for determining a position of a pair of portable devices in close proximity to one another, the system comprising:
   a first portable device configured to determine first positioning data for use in calculating a position of the first portable device in accordance with a first position determination mechanism; and
   a second portable device configured receive the first positioning data from the first portable device, determine second positioning data for use in calculating a position of the second portable device, and to calculate the position of the first portable device, a position of the second portable device in accordance with the first position determination mechanism using both the first and second positioning data, and the second portable device is configured to combine the first and second positioning data so as to provide a more accurate estimate of the position of the first and second portable devices than is possible using only the first or second positioning data alone.

2. The system as claimed in claim 1, wherein the second portable device is operable to calculate its position in accordance with a second position determination mechanism and is configured to form the second positioning data for use in accordance with the second position determination mechanism and calculate said position of the first and second portable devices using the first and the second positioning data.

3. The system as claimed in claim 1, wherein the first positioning data does not comprise an indication of a position of the first portable device.

4. The system as claimed in claim 1, wherein the first portable device is operable to calculate its position in accordance with the first position determination mechanism.

5. The system as claimed in claim 1, wherein the first positioning data is insufficient to allow a unique position to be calculated according to the first position determination mechanism.

6. The system as claimed in claim 1, wherein the second portable device is configured to transmit the second positioning data to the first portable device, and the first portable device is configured to calculate the position of the first and second portable devices using the first and the second positioning data.

7. The system as claimed in claim 6, wherein the first and second portable devices are configured to exchange their respective determinations of the respective positions of the first and second portable devices.

8. The system as claimed in claim 1, wherein the first and second portable devices are operable to communicate by means of a short range radio protocol having a range of less than approximately 100 meters, less than approximately 50 meters, or less than approximately 10 meters.

9. The system as claimed in claim 8, wherein the short range radio protocol is Bluetooth Low Energy and the first portable device is configured to transmit the first positioning data to the second portable device over a broadcast channel.

10. The system as claimed in claim 1, wherein the system further comprises a relay device configured to relay communications between the first and second portable devices.

11. The system as claimed in claim 1, wherein the first position determination mechanism is a GNSS position determination mechanism, and the first positioning data is one or more of: almanac information, ephemeris information, code phase measurements and pseudorange information.

12. The system as claimed in claim 2, wherein the second position determination mechanism is a GNSS position determination mechanism, and the second positioning data is one or more of: almanac information, ephemeris information, code phase measurements, and pseudorange information.

13. The system as claimed in claim 1, wherein the first position determination mechanism is a cellular position calculation mechanism, and the first positioning data is one or more of:
a list of one or more identifiers of cells detectable by the first portable device;
signal strengths of signals received at the first portable device from one or more cell transmitters; propagation times of signals received at the first portable device from one or more cell transmitters; differences in arrival times of simultaneously-transmitted signals received at the first portable device from one or more cell transmitters; angle of arrival information for signals received at the first portable device from one or more cell transmitters; and information identifying respective locations of one or more cells.

14. The system as claimed in claim 13, wherein the cellular position calculation mechanism is one of Cell of Origin, E-OTD, or E-CID.

15. The system as claimed in claim 1, wherein the first position determination mechanism is a Wi-Fi position calculation mechanism, and the first positioning data is one or more of:
a list of one or more BSSIDs of Wi-Fi access points detectable by the first portable device; signal strengths of signals received at the first portable device from one or more Wi-Fi access points; propagation times of signals received at the first portable device from one or more Wi-Fi access points; and information identifying respective locations of one or more Wi-Fi access points.

16. The system as claimed in claim 15, wherein the first portable device is configured to perform the steps of: receiving the locations of a set of one or more Wi-Fi access points; and estimating the distance of the first portable device from at least some of the set of one or more Wi-Fi access points in dependence on the strength of signals received from the at least some of the set of one or more Wi-Fi access points.

17. The system as claimed in claim 2, wherein the second position determination mechanism is a position determination mechanism based on received cellular, GNSS, Wi-Fi, or Bluetooth signals.

18. The system as claimed in claim 1, wherein each of the first and second portable devices is one of a mobile phone, a tablet computer, a personal location device, a laptop, or a digital camera.

19. A method for determining the position of a pair of portable devices in close proximity to one another, the method comprising: determining, by a first portable device of a pair, first positioning data for use in calculating a position of the first portable device in accordance with a first position determination mechanism; transmitting, by the first portable device, the positioning data of a second portable device of the pair; receiving, by the second portable device, the first positioning data from the first portable device;
determining, by the second portable device, second positioning data for use in calculating a position of the second portable device; calculating by the second portable device, the position of the first portable device and the position of the second portable device in accordance with the position determination mechanism using both the first and second positioning data, and combining, by the second portable device, the first and second positioning data so as to provide a more accurate estimate of the position of the first and second portable devices than is possible using only the first or second positioning data alone.

20. The system in claim 1, wherein the first positioning data includes at least one of Wi-Fi access point information, address information, cellular information, Bluetooth transmitter information, and context information.

21. The method of claim 19, wherein the first positioning data includes at least one of Wi-Fi access point information, address information, cellular information, Bluetooth transmitter information, and context information.

22. The system of claim 19, wherein the first positioning data does not comprise an indication of a position of the first portable device.

* * * * *